May 20, 1930.  L. I. YEOMANS  1,758,994
CONVEYER
Filed Oct. 14, 1929
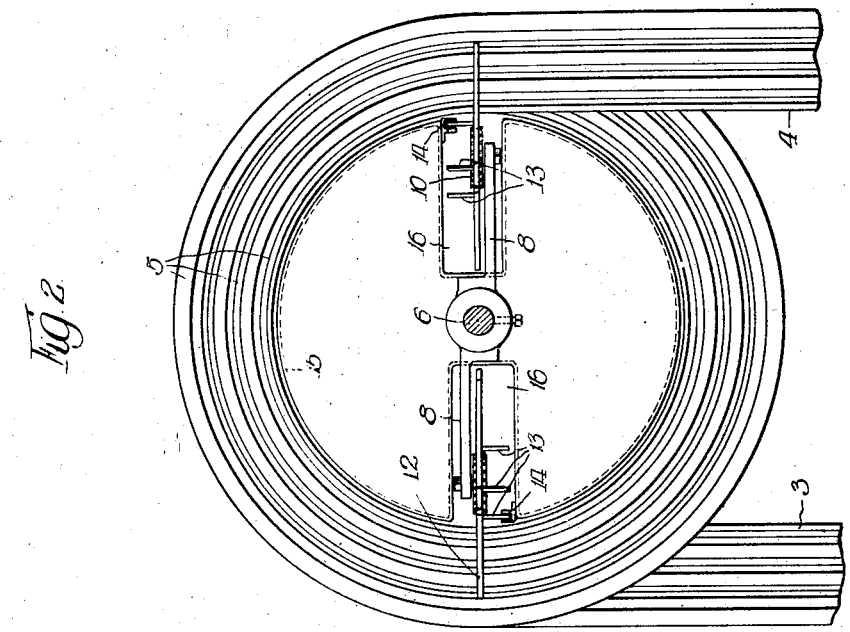
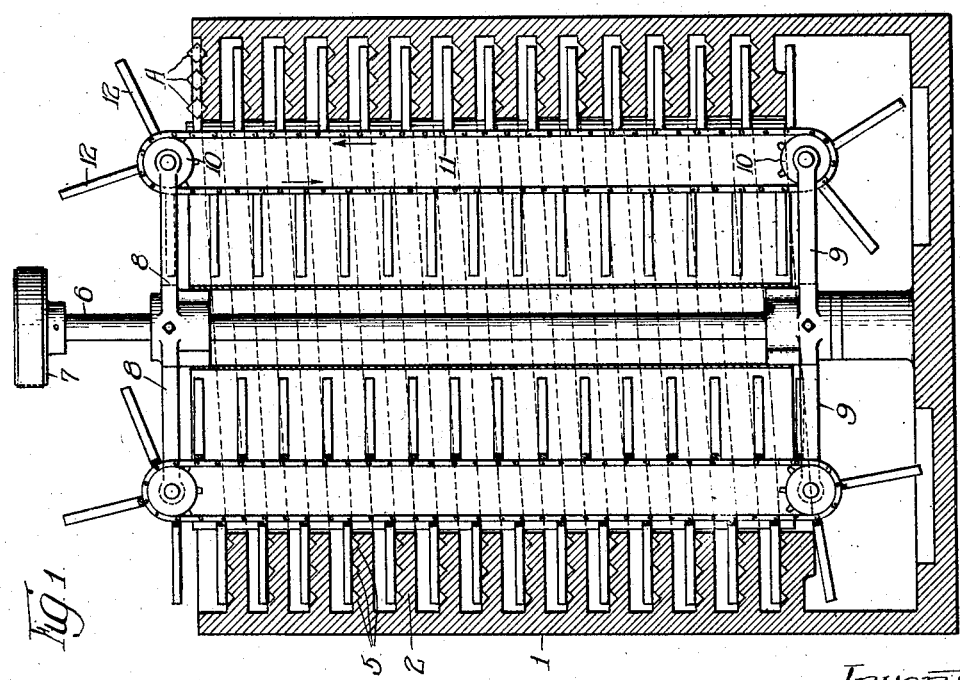
Inventor:
L. I. Yeomans,
By Chindahl Parker Carlson
Attys Patented May 20, 1930

1,758,994

UNITED STATES PATENT OFFICE

LUCIEN I. YEOMANS, OF CHICAGO, ILLINOIS, ASSIGNOR TO LUCIEN I. YEOMANS, INCORPORATED, OF CHICAGO, ILLINOIS, A CORPORATION OF ILLINOIS

CONVEYER

Application filed October 14, 1929. Serial No. 399,456.

This invention relates more particularly to a conveyer which is adapted to provide a long path of travel for articles being processed, with a maximum of capacity and a minimum of complication of mechanism and construction expense.

The usual method of cooking, pasteurizing or sterilizing food and liquids in containers consists in providing a rectangular tank adapted to be partially filled with hot water, and in passing containers through the tank by means of an endless double-stranded chain conveyer from which are suspended perforated baskets. The conveyer is guided to move through a more or less sinuous path. Such a conveyer is necessarily longer than the path through which the packages are to be moved, and consequently is expensive to construct and operate and occupies much space outside the processing tank. It is customary to tilt the baskets to discharge the containers, hence labor must be expended in order to arrange the containers in orderly manner for the following operation.

The present invention aims to obviate the necessity of using a long flexible article-supporting conveyer, of providing means for guiding such a conveyer to move through a sinuous path, and of supplying power for thus moving the supporting element. In the present embodiment of the invention, this object has beeen attained by providing a fixed helical guideway for the articles to be treated, together with simple, inexpensive mechanism for pushing the articles along said guideway or for restraining movement due to the action of gravity.

In the accompanying drawings,

Figure 1 is a vertical central sectional view of an apparatus embodying the features of my invention.

Fig. 2 is a plan view. Both of the views are somewhat diagrammatic.

The embodiment which has been chosen for illustration herein is especially adapted for the drying of paint on toy blocks or cubes of wood. While the blocks may be made to travel either up or down, they are herein shown as being elevated. The apparatus comprises a cylindrical structure 1 which encloses a helical track 2. The lower end of the helical track merges in the tangential track portion 3, the upper end of the helical track being likewise continued in the straight tangential portion 4. In the present instance the helical track 2 and the entrance and exit portions 3 and 4 are adapted to support a plurality of series of articles to be processed, three parallel grooves 5 being formed in the track. The articles being treated are indicated at A in Fig. 1.

The means for moving the series of articles along the guide groove 5 comprises a central vertical shaft 6 to which power may be supplied by any preferred means, as, for example, a pulley 7. The shaft 6 carries one or more pairs of arms. Herein are shown two diametrically opposite pairs of arms, each pair comprising an upper arm 8 and a lower arm 9. Each pair of arms supports sprocket wheels 10 that carry a chain belt 11. Each belt carries a series of pusher fingers 12, each of which is adapted to lie in the space between two adjacent spires of the track 2 and is of sufficient length to extend across the three series of articles A.

In the rotation of the shaft 6 in the clockwise direction, as viewed in Fig. 2, those of the fingers 12 which extend into the spaces between the spires of the track bear against the upper surface of the track and push the articles upwardly through a spiral path. As the pusher fingers are thus propelling the articles upwardly, the chain belt 11 is caused to move in the direction indicated by the arrows in Fig. 1, thus continually bringing the pusher fingers into position to engage the upper side of the lowest spire.

In order to resist the pressure of the articles being propelled, I provide suitable means, as, for example, a finger 13 fixed to each of the pusher fingers 12 and extending at right angles thereto, together with means revolving with the arms 8 and 9 for guiding said fingers 13 to travel vertically with respect to the revolving structure. In the form herein shown, the fingers 13 move upwardly through a channeled guide 14 extending from a point adjacent the lower sprocket wheel to a point adjacent the upper sprocket wheel.

For certain uses, as, for example, for drying or for vapor or gas processing, an apparatus embodying the present invention may have a shell surrounding the helical track, as herein shown, and another shell within the helical track, the latter shell rotating with the revolving propulsion means. In Fig. 2, I have shown a shell 15 fixed to the arms 8 and 9 and of such diameter as to substantially fill the space within the helical track. As indicated in Fig. 2, the shell 15 has two diametrically opposite vertical channels 16 within which the chains 11 and fingers 12 and 13 operate. The channeled guides 14 are herein shown as carried by the shell 15.

It will be seen that an apparatus such as that herein described is adapted to propel articles through a long path and at the same time to raise or lower the articles, as desired. In prior-art conveyers which provided a long path, the propelling and supporting functions were performed by one and the same means, as, for example, a chain or plurality of parallel chains, but it will be observed that I have separated the supporting function from the propelling function and have provided relatively inexpensive stationary means for supporting articles during their travel and a very simple means for performing the propelling function. Whereas in prior long-path conveyers the propelling means has extended throughout the length of travel and back to the starting point, the propelling means herein shown is of such a nature that it is brought repeatedly into operation, thus reducing the amount of chain required to a very small fraction of that which would otherwise be needed.

The form of conveyer herein disclosed is well adapted for passing work through a vacuum processing chamber, as the mechanism may be enclosed within the chamber, the pusher fingers being passed in and out of the entrance and exit portions of the helical track through air-lock devices to preserve the vacuum.

It will be understood that, where conditions require, two or more conveyers of the type herein shown may be connected in series, one conveyer lowering the work and another serving as an elevator.

As will be evident, the present type of conveyer delivers the work in orderly fashion, thus saving labor at the discharge end of the apparatus.

The stationary supporting portion of the conveyer not being subject to intermittent immersion and drying, there is less corrosion in many cases than with a traveling support.

While I have herein shown a cylindrical enclosing structure 1 which constitutes a tank, it will be understood that the conveyer may be enclosed in a tank of other form.

In the case of an elevator, as herein shown, the pusher fingers 12 slide along the upper surface of the track, whereas in an apparatus serving to lower work the fingers would slide along the lower side of the track.

As herein shown, the chain 11 is caused to move about its supporting sprocket wheels by the reaction of the fingers 12 against the track, but if desired, the chain might be driven by other means.

Although I have shown the work as sliding in direct contact with the helical track, it will be obvious that it might be supported in pans or the equivalent.

In the following claims the term "chain" has been used to denote any equivalent flexible element.

I claim as my invention:

1. A conveyer comprising a stationary helical support and propelling means comprising an endless series of members arranged to revolve within the supporting structure as a unit and simultaneously travel in a path parallel to the axis of the helical support.

2. A conveyer comprising a helical support, a structure arranged within and axially of said support, an endless chain supported by said structure to travel parallel with the axis of the helical support and adjacent to the inner circumference of the latter, and a series of members on said chain, each member being adapted to propel articles conveyed along the spires of said helical support, and means to cause relative rotation between the helical support and said structure.

3. A conveyer comprising a stationary helical support, a structure arranged to revolve within and axially of said support, an endless chain supported by said structure to travel parallel with the axis of the helical support and adjacent to the inner circumference of the latter, and a series of members on said chain, each member being adapted to extend into the space between two adjacent spires of said helical support and propel articles conveyed, and means to revolve said structure.

4. A conveyer comprising a stationary helical support, a structure arranged to revolve within and axially of said support, an endless chain supported by said structure to travel parallel with the axis of the helical support and adjacent to the inner circumference of the latter, and a series of members on said chain, each member being adapted to extend into the space between two adjacent spires of said helical support and bear against said support and propel articles conveyed, and means to revolve said structure thereby causing the fingers to move along the helical support.

5. The combination of a cylindrical tank, a conveyer comprising a stationary helical support, a structure arranged to revolve within and axially of said support, an endless chain supported by said structure to travel parallel with the axis of the helical support and adjacent to the inner circumference of the latter, and a series of members on said chain, each member being adapted to extend into the space between two adjacent spires of said helical support and propel articles conveyed, a cylindrical shell within said helical support and connected to rotate with said structure, and means to revolve said structure, thereby causing the fingers to move along the helical support.

In testimony whereof, I have hereunto affixed my signature.

LUCIEN I. YEOMANS.